USO11050331B2

(12) United States Patent
Katsura et al.

(10) Patent No.: US 11,050,331 B2
(45) Date of Patent: Jun. 29, 2021

(54) ROTATIONAL ELECTRIC MACHINE (71) Applicant: EXEDY CORPORATION, Neyagawa (JP)

(72) Inventors: Hitoshi Katsura, Neyagawa (JP); Taichi Kitamura, Neyagawa (JP); Kimitaka Uemura, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 213 days.

(21) Appl. No.: 16/392,101

(22) Filed: Apr. 23, 2019

(65) Prior Publication Data

US 2019/0334421 A1 Oct. 31, 2019

(30) Foreign Application Priority Data

Apr. 27, 2018 (JP) .............................. JP2018-087329

(51) Int. Cl.
*H02K 19/12* (2006.01)
*H02K 19/26* (2006.01)
(Continued)

(52) U.S. Cl.
CPC ........... *H02K 19/12* (2013.01); *H02K 19/103* (2013.01); *H02K 19/24* (2013.01); *H02K 19/26* (2013.01)

(58) Field of Classification Search
CPC .......... H02K 3/28; H02K 7/006; H02K 7/108; H02K 19/12; H02K 19/103; H02K 19/24; H02K 19/26; F02N 11/04
See application file for complete search history.

(56) References Cited

U.S. PATENT DOCUMENTS 468,121 A 2/1892 Thompson
2,928,963 A * 3/1960 Bertsche ................ H02K 19/24
310/168
(Continued)

FOREIGN PATENT DOCUMENTS

CN 204030739 U 12/2014
JP H10-304633 A 11/1998
(Continued)

OTHER PUBLICATIONS

Kurochkin et al., Machine Translation of RU2170487, Jul. 2001 (Year: 2001).*
(Continued)

*Primary Examiner* — Quyen P Leung
*Assistant Examiner* — Eric Johnson
(74) *Attorney, Agent, or Firm* — United IP Counselors, LLC (57) ABSTRACT A brushless winding field rotational electric machine includes: a stator, held to a case, including an alternating-current coil configured to generate a rotation magnetic field by alternating current; a field core, held to the case, including a field coil to be excited by direct current; and a rotor on an outer periphery of a rotation member and rotatably held about a rotational axis relative to the stator and field coil. The field coil includes a plurality of coil winding layers stacked in a radial direction of the rotational axis. A cross-sectional area along an axial direction of the rotational axis, of a coil winding layer closest to the rotational axis in the radial direction of the rotational axis is smaller than a cross-sectional area along the axial direction of the rotational axis, of a coil winding layer farthest from the rotational axis in the radial direction of the rotational axis.

4 Claims, 10 Drawing Sheets

(51) Int. Cl.
  *H02K 19/24* (2006.01)
  *H02K 19/10* (2006.01)

(56) References Cited

U.S. PATENT DOCUMENTS

| | | | | |
|---|---|---|---|---|
| 3,134,039 | A | * | 5/1964 | Bosch .................... H02K 19/24 |
| | | | | 310/168 |
| 3,304,450 | A | * | 2/1967 | Bosco, Jr. ............... H02K 19/24 |
| | | | | 310/126 |
| 3,541,410 | A | * | 11/1970 | Rotherthubert ........ H02K 19/24 |
| | | | | 318/719 |
| 3,555,327 | A | * | 1/1971 | Terry ...................... H02K 5/15 |
| | | | | 310/168 |
| 3,953,753 | A | * | 4/1976 | Barrett .................... H02K 19/24 |
| | | | | 310/168 |
| 4,739,204 | A | * | 4/1988 | Kitamura ............. H02K 11/046 |
| | | | | 123/41.31 |
| 4,958,095 | A | | 9/1990 | Uchida et al. |
| 5,955,807 | A | * | 9/1999 | Kajiura .................. H02K 29/12 |
| | | | | 310/156.66 |
| 9,434,176 | B1 | | 9/2016 | Kroon |
| 2002/0158523 | A1 | | 10/2002 | Abadia et al. |
| 2008/0122309 | A1 | | 5/2008 | Kolomeitsev et al. |
| 2009/0184601 | A1 | | 7/2009 | Dubus et al. |
| 2009/0283344 | A1 | | 11/2009 | Arnold et al. |
| 2010/0026131 | A1 | * | 2/2010 | Popov .................... H02K 1/243 |
| | | | | 310/185 |
| 2011/0234027 | A1 | | 9/2011 | Ramu |
| 2012/0223600 | A1 | * | 9/2012 | Tonogi ................... H02K 1/148 |
| | | | | 310/46 |
| 2013/0154410 | A1 | | 6/2013 | Morita et al. |
| 2017/0218910 | A1 | | 8/2017 | Sato et al. |

FOREIGN PATENT DOCUMENTS

| | | |
|---|---|---|
| JP | H11-243672 A | 9/1999 |
| JP | 3445492 B2 | 9/2003 |
| JP | 3704881 B2 | 10/2005 |
| JP | 2009-508464 A | 2/2009 |
| JP | 2010-516558 A | 5/2010 |
| JP | 1782348 B2 | 9/2011 |
| JP | 1787242 B2 | 10/2011 |
| JP | 2016-211591 A | 12/2016 |
| JP | 2017-013495 A | 1/2017 |
| JP | 2017-136902 A | 8/2017 |
| RU | 2170487 C1 | 7/2001 |
| WO | 2012-029707 A1 | 3/2012 |
| WO | 2018/139561 A1 | 8/2018 |

OTHER PUBLICATIONS

Extended European Search Report for the corresponding European Patent Application No. 19171301.5, dated Sep. 9, 2019, 9 pp.
U.S. Appl. No. 16/392,148, filed Apr. 23, 2019 in the name of Katsura et al.
U.S. Appl. No. 16/392,222, filed Apr. 23, 2019 in the name of Katsura et al.

* cited by examiner

Fig. 12

ROTATIONAL ELECTRIC MACHINE

CROSS-REFERENCE TO RELATED APPLICATION

This application claims the benefit of Japanese Patent Application No. 2018-087329, filed Apr. 27, 2018.

BACKGROUND OF THE INVENTION

Field of the Invention

The present invention relates to a brushless winding field rotational electric machine disposed on an outer periphery of a rotation member.

Description of the Related Art

Patent Document 1 discloses a rotational electric machine in which magnetic flux is supplied from a field coil at rest to a rotor.

PRIOR ART DOCUMENT

Patent Document

Patent Document 1: Japanese Patent No. 3445492

SUMMARY OF THE INVENTION

In the rotational electric machine described above, the field coil has a substantially rectangular sectional shape, which limits the freedom of designing, and thus it may be difficult to have a necessary winding cross-sectional area.

It is an object of the present invention to provide a rotational electric machine that can improve use efficiency of a space in which a field coil is disposed and increase the freedom of designing.

To achieve the object, the present invention is configured as described below.

According to a first aspect of the present invention, a brushless winding field rotational electric machine positioned between a rotation member and a case enclosing the rotation member includes: a stator, which is held to the case, including an alternating-current coil configured to generate a rotation magnetic field by alternating current; a field core, which is held to the case, including a field coil to be excited by direct current; and a rotor disposed on an outer periphery of the rotation member and rotatably held about a rotational axis relative to the stator and the field coil. The field coil includes a plurality of coil winding layers stacked in a radial direction of the rotational axis. A cross-sectional area along an axial direction of the rotational axis, of a coil winding layer closest to the rotational axis in the radial direction of the rotational axis among the plurality of coil winding layers is smaller than a cross-sectional area along the axial direction of the rotational axis, of a coil winding layer farthest from the rotational axis in the radial direction of the rotational axis.

According to a second aspect of the present invention, a brushless winding field rotational electric machine positioned between a case enclosing a rotation member and the rotation member includes: a stator, which is held to the case, including an alternating-current coil configured to generate a rotation magnetic field by alternating current; a field core, which is held to the case, including a field coil to be excited by direct current; and a rotor disposed on an outer periphery of the rotation member and rotatably held about a rotational axis relative to the stator and the field coil. The field coil includes a plurality of coil winding layers stacked in a radial direction of the rotational axis. The plurality of coil winding layers include: a first coil winding layer; and a second coil winding layer adjacent to the first coil winding layer in the radial direction of the rotational axis and having a dimension different from a dimension of the first coil winding layer in an axial direction of the rotational axis.

According to the first aspect of the present invention, the field coil includes the plurality of coil winding layers stacked in the radial direction, and the cross-sectional area of the coil winding layer closest to the rotational axis in the radial direction among the plurality of coil winding layers, along the axial direction of the rotational axis is smaller than the cross-sectional area of the coil winding layer farthest from the rotational axis in the radial direction, along the axial direction of the rotational axis. According to the second aspect of the present invention, the field coil includes the plurality of coil winding layers stacked in the radial direction, and the plurality of coil winding layers include: the first coil winding layer; and the second coil winding layer adjacent to the first coil winding layer in the radial direction and having a dimension different from the dimension of the first coil winding layer in the axial direction of the rotational axis. With such configurations, the sectional shape of the field coil along the axial direction of the rotational axis can be, for example, a substantially L shape or a stepped shape in accordance with a space in which the field coil is disposed, and thus the use efficiency of the space in which the field coil is disposed can be improved to increase the freedom of designing.

DETAILED DESCRIPTION OF THE INVENTION

An embodiment of the present invention will be described below in detail with reference to the accompanying drawings.

Figure 1:
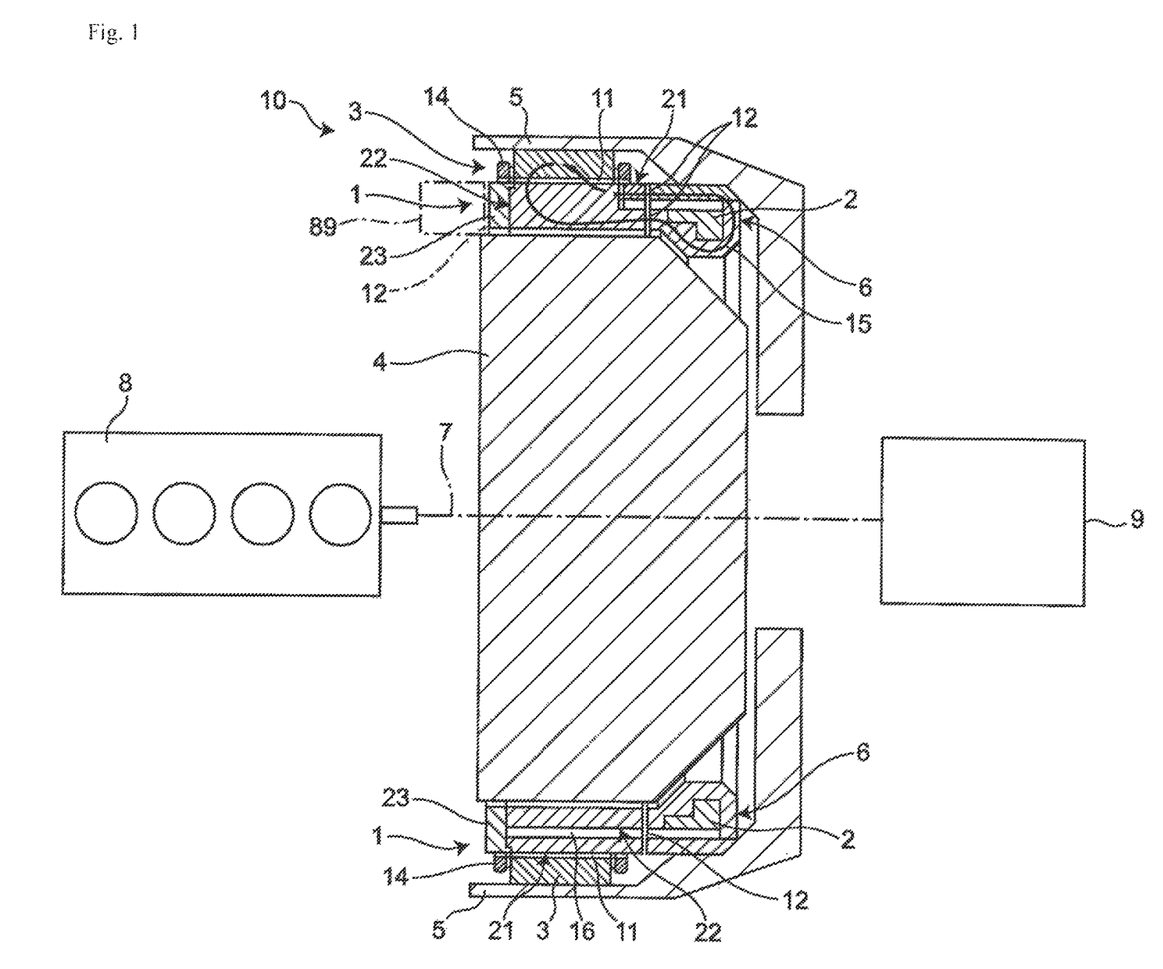
FIG. 1 is a cross-sectional view substantially taken along a direction orthogonal to the rotational axis of a rotational electric machine according to an embodiment of the present invention, and an explanatory diagram illustrating the disposition relation between an engine and a transmission.
Figure 2A:
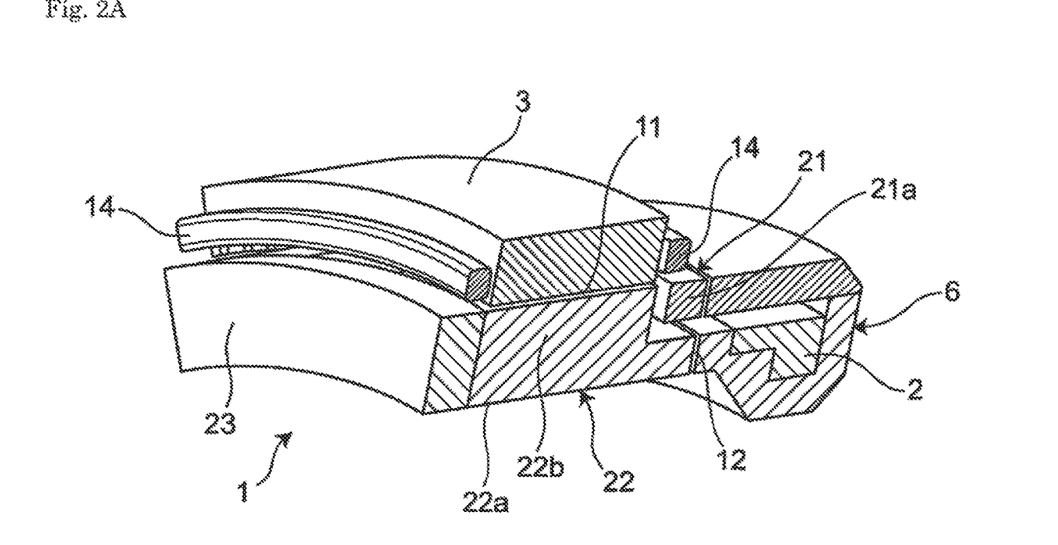
FIG. 2A is a perspective view of the rotational electric machine according to the embodiment when cut in the direction orthogonal to the rotational axis.
Figure 2B:
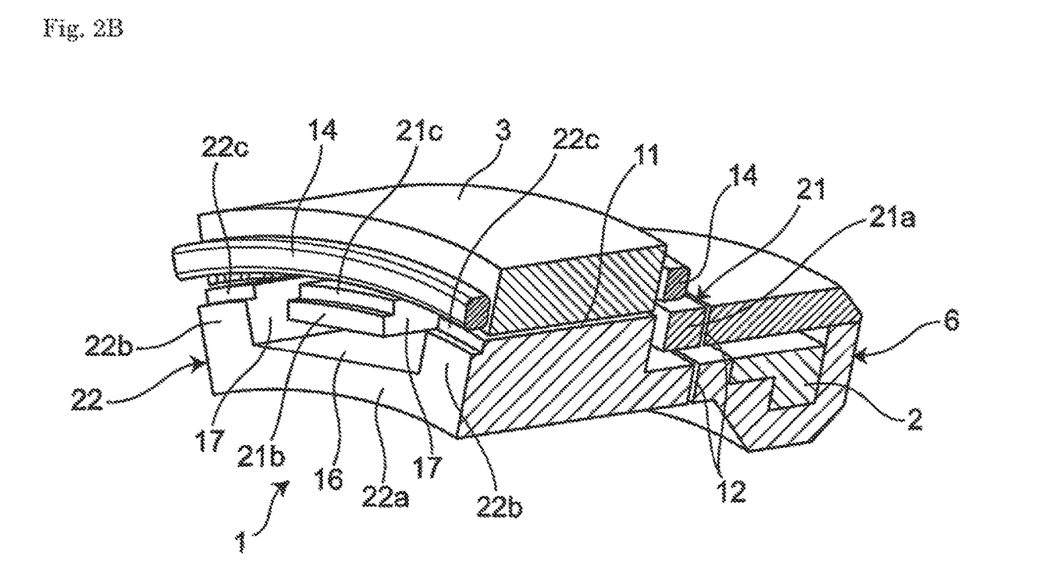
FIG. 2B is a perspective view of a state in which a magnetic pole holder is removed from FIG. 2A.

As illustrated in FIGS. 1 to 28, a rotational electric machine 10 according to an embodiment of the present invention is a brushless winding field rotational electric machine 10 positioned between a starting device 4 (exemplary rotation member) such as a torque converter or a frictional clutch device and a case 5 enclosing the starting device 4. The rotational electric machine 10 includes at least a stator 3, a field coil 2, and a rotor 1. In this embodiment, for example, the rotational electric machine 10 is disposed between an engine 8 and a transmission 9 along a rotational axis 7.

The stator 3 has a cylindrical member non-rotatably fixed and held to the case 5 and including a plurality of slots for winding an alternating-current coil 14. The stator includes the alternating-current coil 14 and generates a rotation magnetic field by alternating current flowing through the alternating-current coil 14.

The field coil 2 is shifted relative to the stator 3 and the rotor 1 in the rotational axis 7, and fixed and held to the case 5 on the transmission 9 side of the stator 3. When the field coil 2 is excited by direct current, magnetic flux (illustrated with an arrow in FIG. 1) flows around the field coil 2, and a magnetic path 40 is formed. A field core 6 includes the field coil 2. The field coil 2 may be shifted to the engine side of the stator 3 through a second air gap 12, not to the transmission 9 side of the stator 3, relative to the stator 3 and the rotor 1 in the rotational axis 7 (refer to a region 89 illustrated with a dashed and single-dotted line in FIG. 1).

Figure 3:
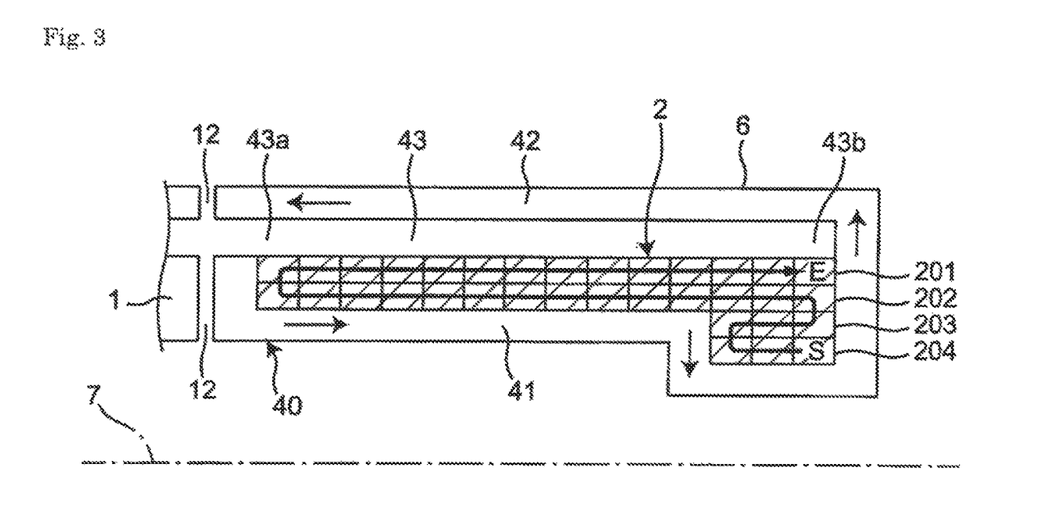
FIG. 3 is a pattern diagram illustrating a section of a field coil of the rotational electric machine according to the embodiment taken along the axial direction of the rotational axis.

Specifically, as illustrated in FIG. 3, the field coil 2 has a substantially L-shaped section in the axial direction of the rotational axis 7, and includes a plurality of coil winding layers (in the present embodiment, four coil winding layers 201 to 204) stacked in the radial direction of the rotational axis 7 (in other words, the up-down direction in FIG. 3). In the field coil 2, the cross-sectional area along the axial direction of the rotational axis 7 of the rotational axis 7, of the coil winding layer 204 closest to the rotational axis 7 in the radial direction among the plurality of coil winding layers 201 to 204 is smaller than the cross-sectional area along the axial direction of the rotational axis 7, of the coil winding layer 204 farthest from the rotational axis 7 in the radial direction of the rotational axis 7.

In other words, the plurality of coil winding layers 201 to 204 include the first coil winding layer 202, and the second coil winding layer 203 adjacent to the first coil winding layer 202 in the radial direction of the rotational axis 7 and having a dimension different from that of the first coil winding layer 202 in the axial direction of the rotational axis 7.

In the field coil 2, wire winding starts at one end (edge farther from the rotor 1, indicated by S in FIG. 3) of the coil winding layer 204 closest to the rotational axis 7 among the plurality of coil winding layers 201 to 204 in the axial direction of the rotational axis 7, and ends at one end (edge farther from the rotor 1, indicated by E in FIG. 3) of the coil winding layer 204 farthest from the rotational axis 7 among the plurality of coil winding layers 201 to 204 in the axial direction of the rotational axis 7. Accordingly, the field coil 2 includes the coil winding layers 201 to 204 in an even number.

The field coil 2 is formed of a winding wire having a substantially rectangular section, but the present invention is not limited thereto. The field coil 2 may be formed of, for example, a winding wire having a substantially circular or substantially square section in accordance with designing of the rotational electric machine 10, for example.

As illustrated in FIG. 3, when viewed in a circumferential direction with respect to the rotational axis 7, the magnetic path 40 formed around the field coil 2 includes a first magnetic path 41 and a second magnetic path 42. The first magnetic path 41 extends in the axial direction of the rotational axis 7 so that magnetic flux flows from the rotor 1 toward the field core 6. The second magnetic path 42 extends in the axial direction of the rotational axis 7 and is disposed with a gap 43 from the first magnetic path 41 in the radial direction so that magnetic flux flows from the field core 6 toward the rotor 1. The field coil 2 is disposed from a first end portion 43a of the gap 43 closer to the rotor 1 to a second end portion 43b thereof farther from the rotor 1 in the axial direction of the rotational axis 7.

The rotor 1 is fixed to the outer periphery of the starting device 4. The outer peripheral surface of the rotor 1 faces the inner peripheral surface of the stator 3 and an end face of the rotor 1 on the transmission side faces an end face of the field coil 2 on the engine side. The rotor 1 is held rotatably relative to the stator 3 and the field coil 2 about the rotational axis 7

A first air gap 11 is formed between the stator 3 and the rotor 1 so that magnetic flux is transferred between the stator 3 and the rotor 1. The first air gap 11 extends in the axial direction of the rotational axis 7 between the inner peripheral surface of the stator 3 and the outer peripheral surface of the rotor 1.

The second air gap 12 is formed between the field core 6 and the rotor 1 so that magnetic flux is transferred between the field coil 2 and the rotor 1. The second air gap 12 extends in the radial direction orthogonal to the axial direction of the rotational axis 7 between the end face of the rotor 1 on the transmission side in the axial direction of the rotational axis 7 and an end face of the field core 6 on the engine side.

Accordingly, the field coil 2 is shifted in parallel relative to the rotor 1 in the axial direction of the rotational axis 7 through the second air gap 12.

Figure 4:
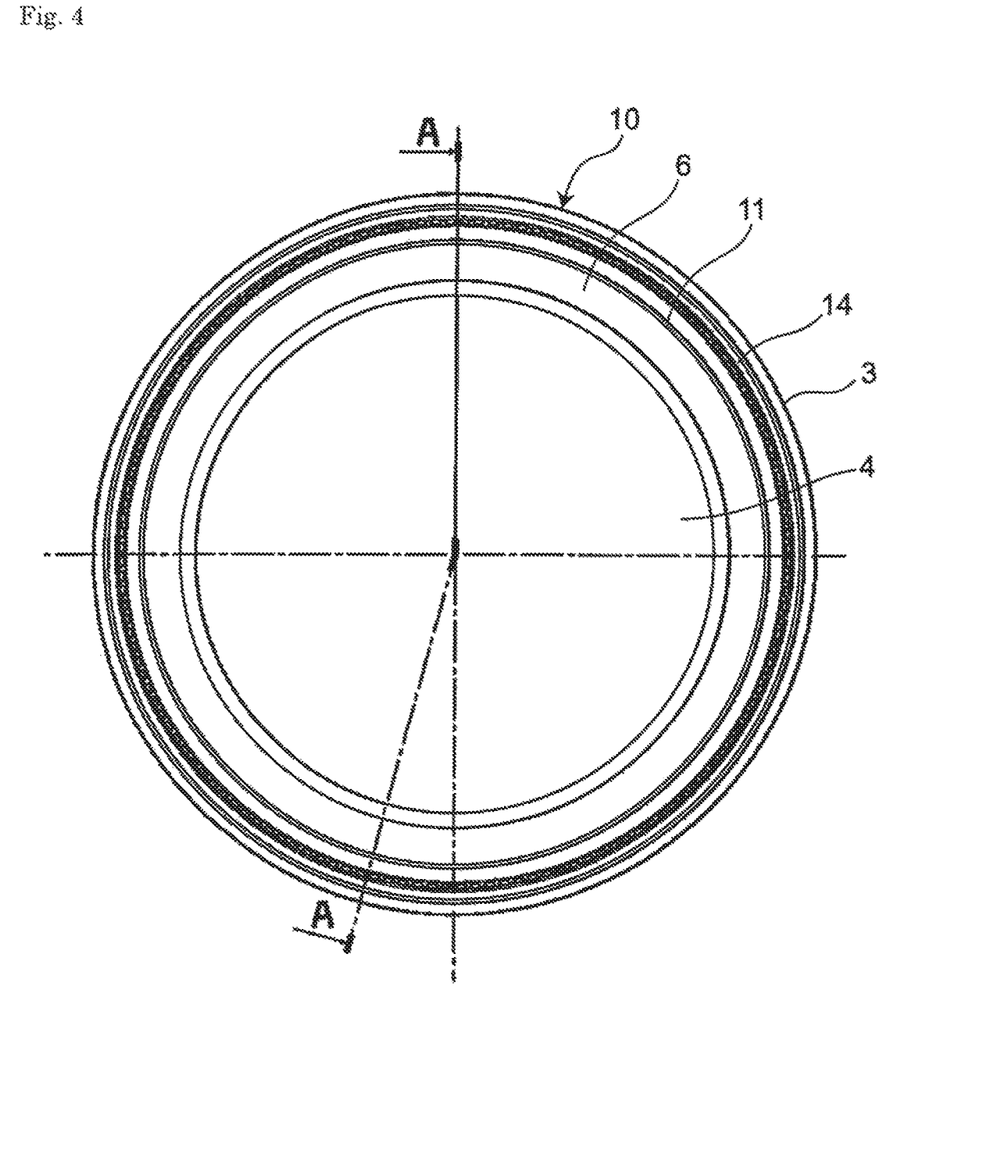
FIG. 4 is a front view of the rotational electric machine according to the embodiment when viewed from a transmission side.

As illustrated in FIGS. 4 to 7, the rotor 1 is formed by combining a first magnetic pole 21, a second magnetic pole 22, and a magnetic pole holder 23. A cross-sectional view taken along line A-A in FIG. 4 is a cross-sectional view of the rotational electric machine 10, the starting device 4, and the like at the center in FIG. 1.

The first magnetic pole 21 is made of a soft magnetic body such as iron, and includes a plurality of pawl portions 21b each having, for example, a rectangular thin plate shape and protruding from a first circular ring portion 21a in the axial direction of the rotational axis 7. The pawl portions 21b are disposed at constant intervals, for example, at equal intervals in the circumferential direction, and have equal lengths in the axial direction of the rotational axis 7. The outer peripheral surface of each pawl portion 21b is disposed along the outer peripheral surface of the first circular ring portion 21a. The pawl portion 21b does not contact the second magnetic pole 22 even when the first magnetic pole 21 and the second magnetic pole 22 are combined with each other, and a radial direction gap 16 is formed in the radial direction of the rotational axis 7.

Figure 5:
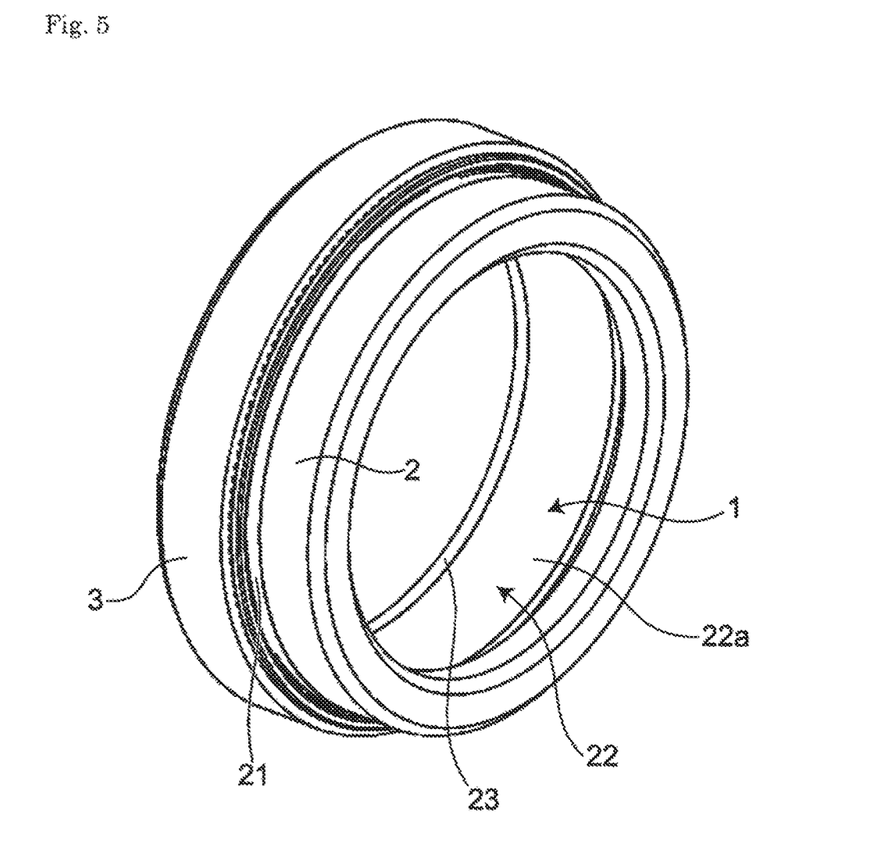
FIG. 5 is a perspective view of the rotational electric machine according to the embodiment.

The second magnetic pole 22 is made of a soft magnetic body such as iron and disposed on an inner side of the first magnetic pole (in the present embodiment, the first circular ring portion 21a) through the radial direction gap 16 in a radial direction of the rotational axis 7. The second magnetic pole 22 includes a second circular ring portion 22a disposed partially overlapping the first magnetic pole (in the present embodiment, the first circular ring portion 21a) and a plurality of convex portions 22b. Each of the plurality of convex portions 22b, which has a rectangular plate shape for example, protrudes from an outer peripheral surface of the second circular ring portion 22a in the radial direction of the rotational axis 7 and has a circumferential direction gap 17 in a circumferential direction of the rotational axis 7. The convex portions 22b are disposed at constant intervals, for example, at equal intervals in the circumferential direction, and have equal heights in the radial direction of the rotational axis 7. The convex portions 22b have equal lengths in the axial direction of the rotational axis 7 and are shorter than the pawl portions 21b. The outer peripheral surface of each convex portion 22b is disposed on one circle having a center at the rotational axis of the rotor 1. Each convex portion 22b extends to an end edge of the second circular ring portion 22a on the engine side to form a first leading end lock portion 22c, but does not extend to an end edge of the second circular ring portion 22a on the transmission side to form a circular ring fitting portion 22d having a small width with no convex portion 22b. The first magnetic pole 21 is moved relative to the second magnetic pole 22 in the axial direction of the rotational axis 7 to insert each pawl portion 21b of the first magnetic pole 21 into a middle part of the circumferential direction gap 17 between the convex portions 22b adjacent thereto so that the pawl portions 21b and the convex portions 22b are alternately arranged in the circumferential direction of the rotational axis 7. In this case, the first circular ring portion 21a of the first magnetic pole 21 can be disposed on the outside of the fitting portion 22d with the radial direction gap 16 interposed therebetween. In the assembled state as illustrated in FIG. 5, an axial direction gap 19 is formed between the convex portions 22b and the first circular ring portion 21a, the circumferential direction gap 17 is formed in the circumferential direction of the rotational axis 7 between each pawl portion 21b and the corresponding convex portion 22b of the second magnetic pole 22, and the radial direction gap 16 is formed in the radial direction of the rotational axis 7. Accordingly, the first magnetic pole 21 and the second magnetic pole 22 are maintained in a non-contact state. For fixation in this state, the second magnetic pole 22 further includes a magnetic pole holder 23.

Figure 6:
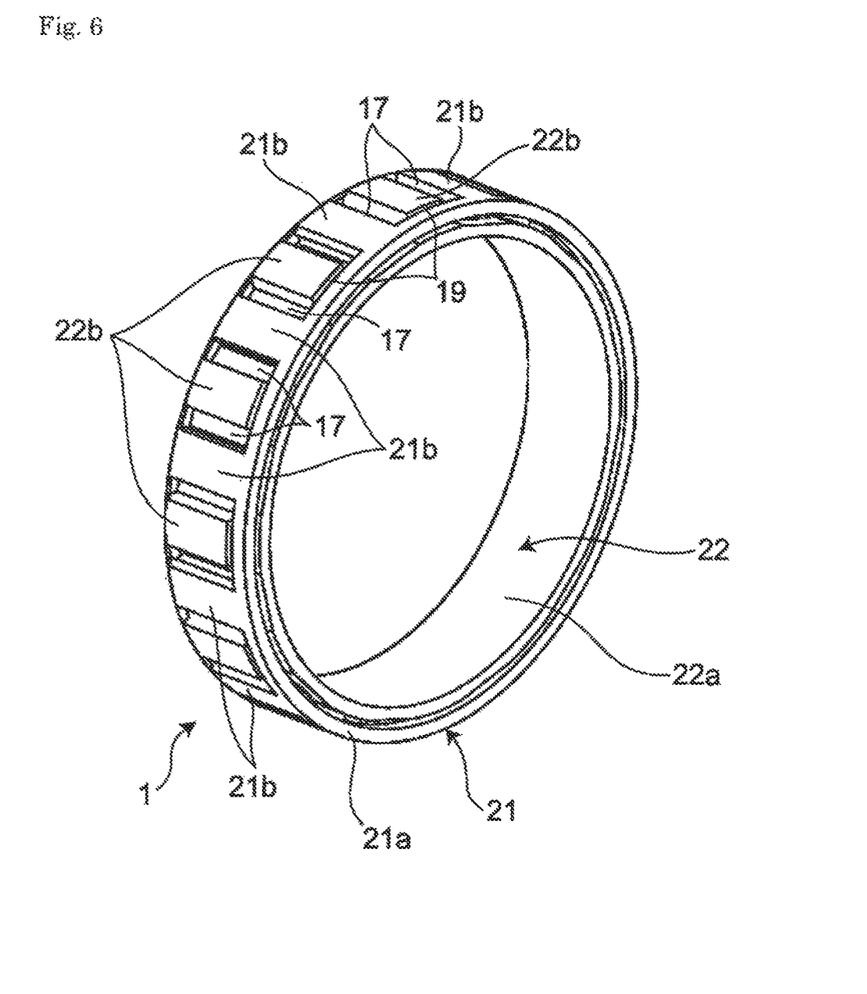
FIG. 6 is a perspective view of a rotor of the rotational electric machine according to the embodiment.
Figure 7:
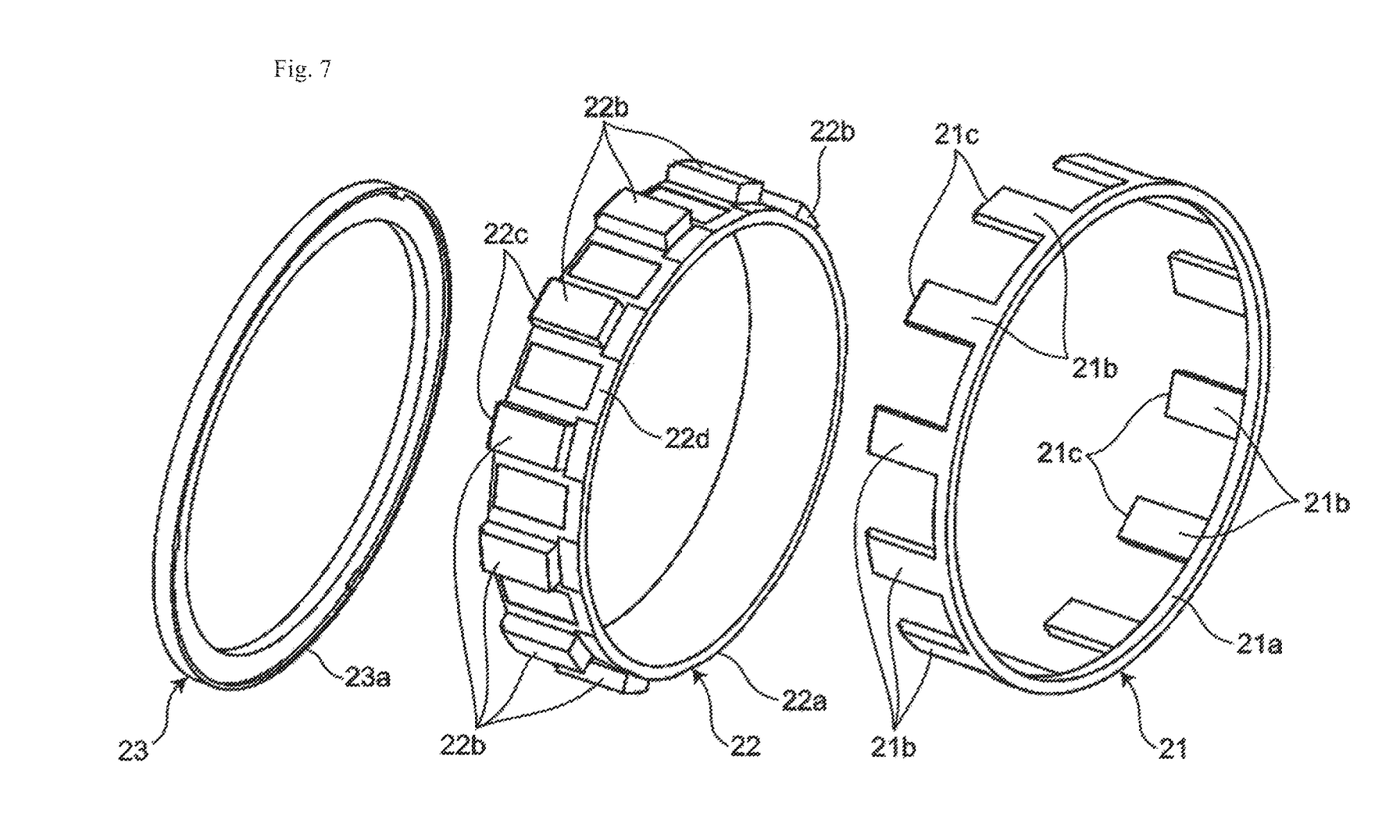
FIG. 7 is an exploded perspective view of the rotor of the rotational electric machine according to the embodiment.

The magnetic pole holder 23 is a circular ring member made of a non-magnetic body such as aluminum or austenitic stainless steel. The magnetic pole holder 23 includes, for example, on the outer periphery side, an engagement portion 23a that engages and fixes a first leading end lock portion 21c of each pawl portion 21b of the first magnetic pole 21 and engages and fixes a second leading end lock portion 22c of each convex portion 22b of the second magnetic pole 22. The first leading end lock portion 21c and the second leading end lock portion 22c are engaged with the engagement portion 23a and fixed by bolting, shrink fitting, or brazing. Accordingly, the first magnetic pole 21 and the second magnetic pole 22 are fixed and held to each other in a non-contact manner by the magnetic pole holder 23.

As a specific example, the first leading end lock portions 21c of the pawl portions 21b of the first magnetic pole 21 and the second leading end lock portions 22c of the convex portions 22b of the second magnetic pole 22 are formed as stepped portions, and fixedly held in the radial direction of the rotational axis 7 when the stepped portions are each engaged with an engagement recess of the engagement portion 23a. As an example, the second leading end lock portions 22c are disposed at the leading ends of the convex portions 22b, but may be disposed at the leading end of the second circular ring portion 22a. With this configuration, when the first magnetic pole 21 and the second magnetic pole 22 are magnetized as magnetic flux flows from the field coil 2, the magnetic pole holder 23 as a non-magnetic body can eliminate magnetic short circuit to efficiently perform the magnetization and can mechanically hold the first magnetic pole 21 and the second magnetic pole 22. In addition, since the first leading end lock portions 21c of the pawl portions 21b of the first magnetic pole 21 are engaged and fixed by the engagement portion 23a of the magnetic pole holder 23, expansion of the pawl portions 21b due to rotational centrifugal force can be prevented to improve rotational strength.

In the rotational electric machine 10 configured as described above, field coil magnetic flux 15 occurs when the field coil 2 is energized. The field coil magnetic flux 15 starts from the field core 6 and returns to the field core 6 through a second air gap 212, the first magnetic pole 21 of the rotor 1, the first air gap 11, the stator 3, the first air gap 11, the second magnetic pole 22 of the rotor 1, and the second air gap 212. In this case, for example, when the field coil 2 is energized with direct current, the field coil magnetic flux 15 is generated and the first magnetic pole 21 and the second magnetic pole 22 are magnetized, for example, as a north pole and a south pole, respectively.

The following describes a case in which the rotational electric machine 10 as a starter executes a start function in such a rotational electric machine 10. An inverter (not illustrated) is driven based on a start command of the engine 8 to cause three-phase alternating current to flow through the stator 3 and magnetize the stator 3, and cause current to flow through the field coil 2. Current is caused to flow through the field coil 2, thereby exciting the first magnetic pole 21 and the second magnetic pole 22 of the rotor 1. As a result, the rotor 1 starts rotation relative to the stator 3, and electromotive force having induction voltage is generated at the stator 3.

Thereafter, when the induction voltage increases in accordance with the rotational speed of the rotor 1 and the rotational speed reaches an initial explosion rotational speed lower than an idling rotational speed corresponding to idling of the engine 8, which completes start of the engine 8, the drive of the inverter is stopped. Since then, transition is automatically made to a power generation mode in which the rotational electric machine 10 executes an electric generation function as an electric generator to hold predetermined induction voltage (request voltage).

In the power generation mode, the excitation current is adjusted so that the induction voltage is constant at the predetermined induction voltage to continuously excite the field coil 2. The excitation current is adjusted so that the magnetization force of the rotor decreases as the rotational speed increases and the induction voltage is kept constant. When the field coil 2 is not excited, the advance of the three-phase alternating current is adjusted by the inverter so that the induction voltage is constant at the predetermined induction voltage. Further, the above-described two methods may be combined to achieve the adjustment. With this control, the rotational electric machine 10 functions as an electric generator when the rotor 1 rotates.

As a result, when connected to the engine 8, the rotational electric machine 10 can start the engine and function as a generator (electric generator) in traveling.

In the rotational electric machine 10, the field coil 2 includes the plurality of coil winding layers 201 to 204 stacked in the radial direction of the rotational axis 7. The cross-sectional area along the axial direction of the rotational axis 7, of the coil winding layer 204 closest to the rotational axis 7 in the radial direction of the rotational axis 7 among the plurality of coil winding layers 201 to 204 is smaller than the cross-sectional area along the axial direction of the rotational axis 7, of the coil winding layer 201 farthest from the rotational axis 7 in the radial direction of the rotational axis 7. In other words, the field coil 2 includes the plurality of coil winding layers 201 to 204 stacked in the radial direction of the rotational axis 7. The plurality of coil winding layers 201 to 204 include the first coil winding layer 202, and the second coil winding layer 203 adjacent to the first coil winding layer 202 in the radial direction of the rotational axis 7 and having a dimension different from that of the first coil winding layer 202 in the axial direction of the rotational axis 7. With this configuration, the sectional shape of the field coil 2 along the axial direction of the rotational axis 7 can be, for example, a substantially L shape in accordance with a space in which the field coil 2 is disposed, and thus the use efficiency of the space in which the field coil 2 is disposed can be improved to increase the freedom of designing.

The magnetic path 40 includes a first magnetic path 41 extending in the axial direction of the rotational axis 7 so that magnetic flux flows from the rotor 1 toward the field core 6, and a second magnetic path 42 extending in the axial direction of the rotational axis 7 and disposed with the gap 43 from the first magnetic path 41 in the radial direction so that magnetic flux flows from the field core 6 toward the rotor 1. The field coil 2 is disposed from a first end portion 43a of the gap 43 closer to the rotor 1 to a second end portion 43b farther from the rotor 1 in the axial direction of the rotational axis 7. With such a configuration in which the field core 6 is longer in the axial direction than in the radial direction, magnetic short circuit (in other words, magnetic flux leakage) in the magnetic path 40 of the field core 6 can be reduced.

In the field coil 2, wire winding starts at one end of a coil winding layer 204 closest to the rotational axis 7 among the plurality of coil winding layers 201 to 204 in the axial direction of the rotational axis 7, and ends at one end of a coil winding layer 201 farthest from the rotational axis 7 among the plurality of coil winding layers 201 to 204 in the axial direction of the rotational axis 7. With this configuration, it is possible to easily obtain the field coil 2 having a sectional shape along the axial direction of the rotational axis 7 in accordance with a space in which the field coil 2 is disposed.

Figure 8:
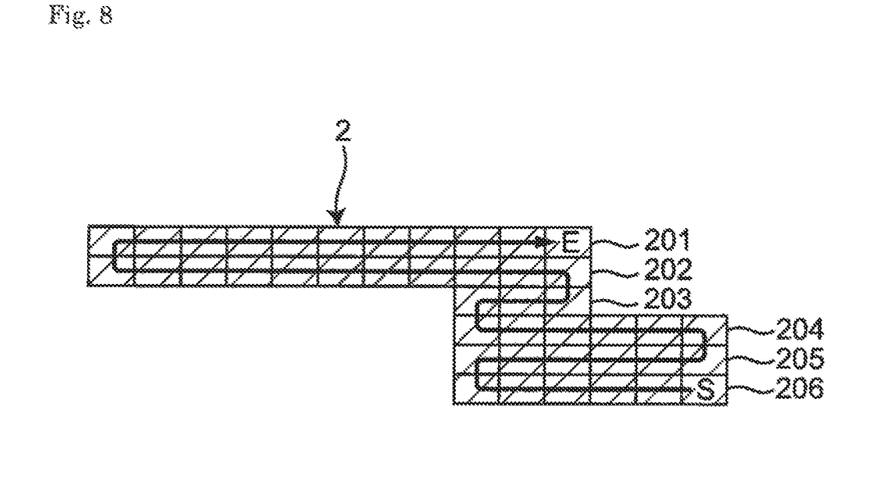
FIG. 8 is a pattern diagram illustrating a first modification of the section of the field coil of the rotational electric machine according to the embodiment taken along the axial direction of the rotational axis.
Figure 9:
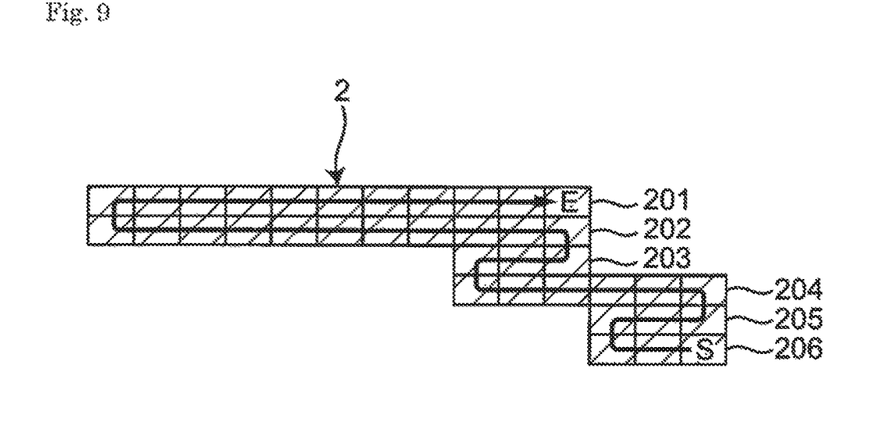
FIG. 9 is a pattern diagram illustrating a second modification of the section of the field coil of the rotational electric machine according to the embodiment taken along the axial direction of the rotational axis.

As illustrated in FIGS. 8 and 9, the sectional shape of the field coil 2 in the axial direction of the rotational axis 7 is not limited to an L shape, but may be a stepped shape in accordance with a space in which the field coil 2 is disposed. The field coil 2 in FIGS. 8 and 9 includes six coil winding layers 201 to 206 stacked in the radial direction of the rotational axis 7. In this manner, the dimension of each of the coil winding layers 201 to 206 in the axial direction of the rotational axis 7 can be changed in accordance with for example, designing of the rotational electric machine 10, and thus the use efficiency of the space in which the field coil 2 is disposed can be improved to increase the freedom of designing. FIGS. 8 and 9 illustrate the field coil 2 only, and omit the magnetic path 40.

Figure 10:
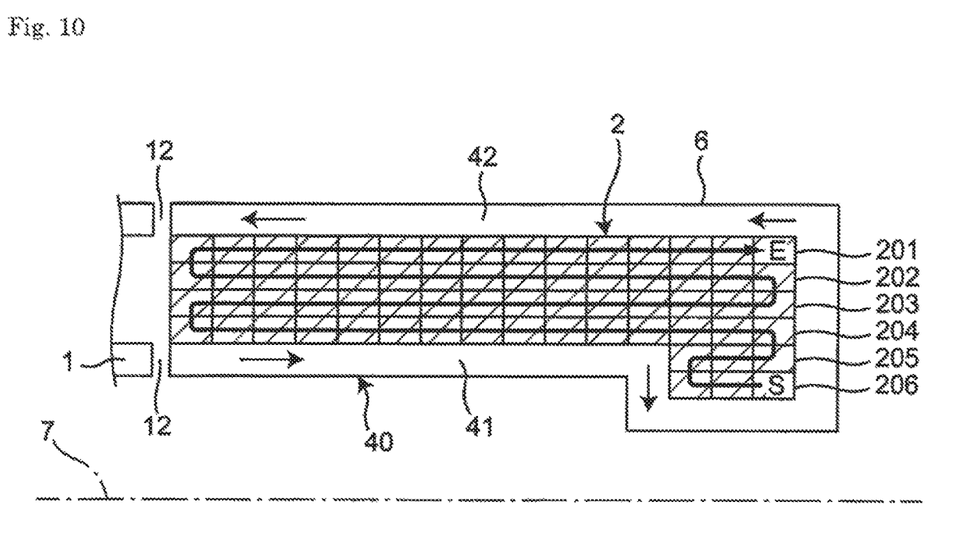
FIG. 10 is a pattern diagram illustrating a third modification of the section of the field coil of the rotational electric machine according to the embodiment taken along the axial direction of the rotational axis.
Figure 11:
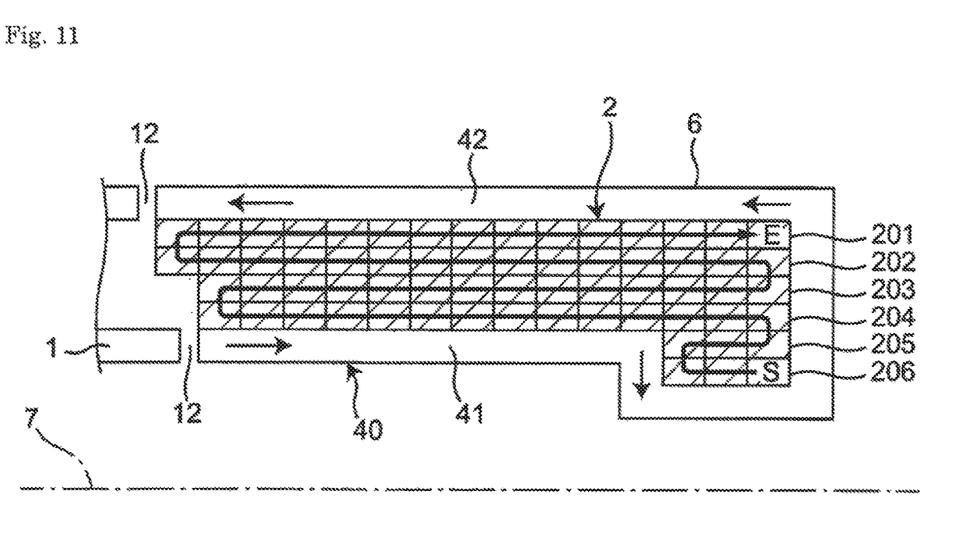
FIG. 11 is a pattern diagram illustrating a fourth modification of the section of the field coil of the rotational electric machine according to the embodiment taken along the axial direction of the rotational axis.
Figure 12:
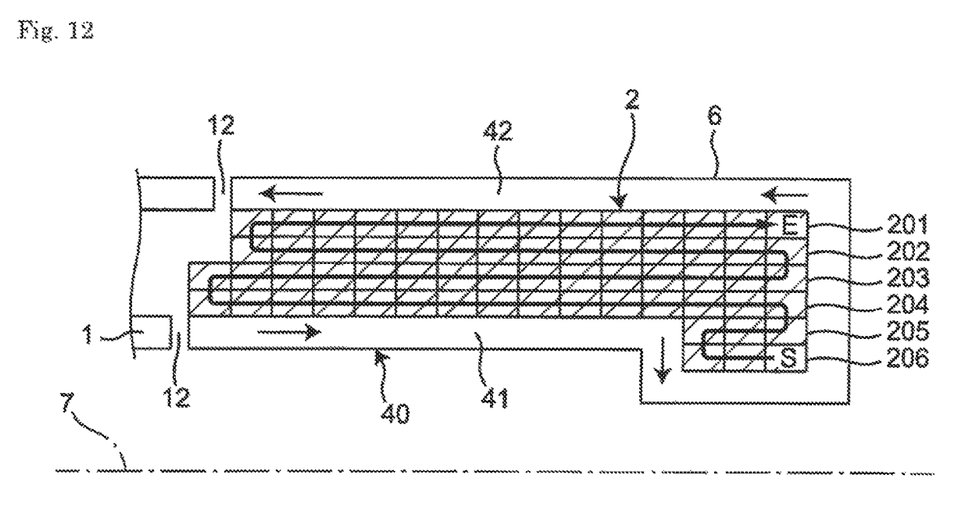
FIG. 12 is a pattern diagram illustrating a fifth modification of the section of the field coil of the rotational electric machine according to the embodiment taken along the axial direction of the rotational axis.

As illustrated in FIGS. 10 to 12, the first magnetic path 41 and the second magnetic path 42 may be disposed in contact with the field coil 2 and sandwich the field coil 2 therebetween in the radial direction of the rotational axis 7. As illustrated in FIG. 10, end portions of the first magnetic path 41, the second magnetic path 42, and the field coil 2 on the rotor 1 side in the axial direction of the rotational axis 7 may be disposed at substantially the same positions in the axial direction of the rotational axis 7. In this case, magnetic short circuit is further unlikely to occur between the first magnetic path 41 and the second magnetic path 42 due to the field coil 2 interposed therebetween. As illustrated in FIG. 11, the end portion of the first magnetic path 41 on the rotor 1 side in the axial direction of the rotational axis 7 may be shorter in the axial direction of the rotational axis 7 than the end portions of the second magnetic path 42 and the field coil 2 on the rotor 1 side in the axial direction of the rotational axis 7 (in other words, the end portion of the first magnetic path 41 on the rotor 1 side in the axial direction of the rotational axis 7 may have a stepped shape approaching the rotor 1 from the first magnetic path 41 toward the second magnetic path 42). With this configuration, magnetic short circuit is more unlikely to occur than with the configuration illustrated in FIG. 10. As illustrated in FIG. 12, the end portion of the second magnetic path 42 on the rotor 1 side in the axial direction of the rotational axis 7 may be shorter in the axial direction than the end portions of the first magnetic path 41 and the field coil 2 on the rotor 1 side in the axial direction of the rotational axis 7 (in other words, the end portion of the first magnetic path 41 on the rotor 1 side in the axial direction of the rotational axis 7 may have a stepped shape approaching the rotor 1 from the second magnetic path 42 toward the first magnetic path 41). With this configuration, too, magnetic short circuit is more unlikely to occur than with the configuration illustrated in FIG. 10.

Any embodiments or modifications among various embodiments or modifications described above may be combined with each other as appropriate to achieve effects of each embodiment or modification. It is possible to combine embodiments, examples, or an embodiment and an example, and it is also possible to combine features in different embodiments or examples.

A rotational electric machine according to the aspect of the present invention is applicable to, for example, a vehicle or a power generation device.

DESCRIPTION OF REFERENCE SIGNS

1: Rotor
2: Field coil
201 to 206: Coil winding layer
3: Stator
4: Starting device (exemplary rotation member)
5: Case
6: Field core
7: Rotational axis
8: Engine
9: transmission 10: Brushless winding field rotational electric machine
11: First air gap
12: Second air gap
14: Alternating-current coil
15: Field coil magnetic flux
16: Radial direction gap
17: Circumferential direction gap
19: Axial direction gap
21: First magnetic pole
21a: First circular ring portion
21b: Pawl portion
21c: First leading end lock portion
22: Second magnetic pole
22a: Second circular ring portion
22b: Convex portion
22c: Second leading end lock portion
22d: Fitting portion
23: Magnetic pole holder
23a: Engagement portion
40: Magnetic path
41: First magnetic path
42: Second magnetic path
43: Gap
43a: First end portion
43a: Second end portion
89: Region of field coil shifted to engine side of stator

The invention claimed is:

1. A brushless winding field rotational electric machine positioned between a rotation member and a case enclosing the rotation member comprising:
a stator, which is held to the case, including an alternating-current coil configured to generate a rotation magnetic field by alternating current;
a field core, which is held to the case, including a field coil to be excited by direct current; and
a rotor disposed on an outer periphery of the rotation member and rotatably held about a rotational axis thereof relative to the stator and
the field coil, wherein the field coil includes a plurality of coil winding layers stacked in a radial direction of the rotational axis,
a cross-sectional area along an axial direction of the rotational axis, of a coil winding layer closest to the rotational axis in the radial direction among the plurality of coil winding layers is smaller than a cross-sectional area along the axial direction, of a coil winding layer farthest from the rotational axis in the radial direction,
a cross-sectional area of the plurality of coil winding layers along the radial direction of the coil winding layer closest to the rotor in the axis direction is smaller than a cross-sectional area of the plurality of coil winding layers along the radial direction of the coil winding layer farthest from the rotor in the axis direction,
a magnetic path includes a first magnetic path and a second magnetic path,
the first magnetic path extends in the axial direction of the rotational axis in the field core so that magnetic flux flows from the rotor toward the field core,
the second magnetic path extends in the axial direction of the rotational axis in the field core and disposed with a gap from the first magnetic path in the radial direction so that magnetic flux flows from the field core toward the rotor, and
the field coil is disposed from a first end portion of the gap closer to the rotor to a second end portion farther from the rotor in the axial direction.

2. The rotational electric machine according to claim 1, wherein
wire winding starts at one end of a coil winding layer closest to the rotational axis among the plurality of coil winding layers in the axial direction of the rotational axis, and ends at one end of a coil winding layer farthest from the rotational axis among the plurality of coil winding layers in the axial direction of the rotational axis.

3. A brushless winding field rotational electric machine positioned between a rotation member and a case enclosing the rotation member comprising:
a stator, which is held to the case, including an alternating-current coil configured to generate a rotation magnetic field by alternating current;
a field core, which is held to the case, including a field coil to be excited by direct current; and
a rotor disposed on an outer periphery of the rotation member and rotatably held about a rotational axis relative to the stator and
the field coil, wherein the field coil includes a plurality of coil winding layers stacked in a radial direction of the rotational axis,
the plurality of coil winding layers include: a first coil winding layer; and a second coil winding layer adjacent to the first coil winding layer in the radial direction of the rotational axis and having a dimension different from a dimension of the first coil winding layer in an axial direction of the rotational axis,
the field coil further includes a first surface facing the rotor in the axial direction and a second surface opposed to the first surface in the axial direction, the first surface being smaller than the second surface,
a magnetic path includes a first magnetic path and a second magnetic path,
the first magnetic path extends in the axial direction of the rotational axis in the field core so that magnetic flux flows from the rotor toward the field core,
the second magnetic path extends in the axial direction of the rotational axis in the field core and disposed with a gap from the first magnetic path in the radial direction of the rotational axis so that magnetic flux flows from the field core toward the rotor, and
the field coil is disposed completely within the field core from a first end portion of the gap closer to the rotor to a second end portion farther from the rotor in the axial direction of the rotational axis.

4. The rotational electric machine according to claim 3, wherein
wire winding starts at one end of a coil winding layer closest to the rotational axis among the plurality of coil winding layers in the axial direction of the rotational axis, and ends at one end of a coil winding layer farthest from the rotational axis among the plurality of coil winding layers in the axial direction of the rotational axis.

\* \* \* \* \*